(12) United States Patent
James

(10) Patent No.: US 12,078,533 B2
(45) Date of Patent: Sep. 3, 2024

(54) UNDERWATER CAMERA AS LIGHT SENSOR

(71) Applicant: TidalX AI Inc., San Ramon, CA (US)

(72) Inventor: Barnaby John James, Campbell, CA (US)

(73) Assignee: TidalX AI Inc., San Ramon, CA (US)

( * ) Notice: Subject to any disclaimer, the term of this patent is extended or adjusted under 35 U.S.C. 154(b) by 365 days.

(21) Appl. No.: 17/337,004

(22) Filed: Jun. 2, 2021

(65) Prior Publication Data

US 2022/0390275 A1 Dec. 8, 2022

(51) Int. Cl.
| | |
|---|---|
| G06K 9/00 | (2022.01) |
| G01B 11/22 | (2006.01) |
| G01J 1/18 | (2006.01) |
| G01J 1/42 | (2006.01) |
| G01J 1/44 | (2006.01) |

(52) U.S. Cl.
CPC .......... *G01J 1/4204* (2013.01); *G01B 11/22* (2013.01); *G01J 1/18* (2013.01); *G01J 1/44* (2013.01)

(58) Field of Classification Search
CPC ..................................................... A01K 61/80
See application file for complete search history.

(56) References Cited

U.S. PATENT DOCUMENTS

| | | | |
|---|---|---|---|
| 4,139,801 A | 2/1979 | Linares | |
| 5,648,656 A | 7/1997 | Begemann et al. | |
| 6,084,231 A | 7/2000 | Popat | |
| 7,781,713 B2 | 8/2010 | Papamichael et al. | |
| 10,856,520 B1 * | 12/2020 | Kozachenok | .......... A01K 61/80 |
| 10,863,727 B2 | 12/2020 | Jans | |
| 11,464,213 B2 | 10/2022 | Rishi et al. | |

(Continued)

FOREIGN PATENT DOCUMENTS

| | | |
|---|---|---|
| CL | 2019000039 A1 | 3/2019 |
| CN | 108040948 | 5/2018 |

(Continued)

OTHER PUBLICATIONS

International Search Report and Written Opinion in International Appln. No. PCT/US2022/021683, dated Jun. 27, 2022, 14 pages.

(Continued)

*Primary Examiner* — Hadi Akhavannik

(74) *Attorney, Agent, or Firm* — Fish & Richardson P.C.

(57) ABSTRACT

Methods, systems, and apparatus, including computer programs encoded on a computer storage medium that automatically performs actions in an aquaculture environment based on light sensed by underwater cameras. One of the methods includes obtaining images of a surface of water captured by a camera that faces upwards from a depth towards the surface of the water within an enclosure that encloses aquatic livestock. An ambient light metric is determined at the depth from the images of the surface of the water. A determination is made as to whether the camera satisfies one or more depth criteria. Based on determining that the depth of the camera satisfies the one or more depth criteria, it is determined that, based on the ambient light metric at the depth, one or more action criteria are satisfied, then initiating performance of an action to be performed for the aquatic livestock.

20 Claims, 2 Drawing Sheets

(56) References Cited

U.S. PATENT DOCUMENTS

| | | | | |
|---|---|---|---|---|
| 2013/0152864 | A1* | 6/2013 | Grajcar | A01K 63/06 |
| | | | | 362/101 |
| 2013/0174792 | A1* | 7/2013 | Delabbio | A01K 61/59 |
| | | | | 119/200 |
| 2013/0273599 | A1 | 10/2013 | Robitaille | |
| 2015/0015775 | A1 | 1/2015 | Nagata et al. | |
| 2015/0136037 | A1* | 5/2015 | Boonekamp | A01K 63/06 |
| | | | | 315/153 |
| 2015/0164052 | A1* | 6/2015 | Delabbio | A01K 61/00 |
| | | | | 119/200 |
| 2016/0212409 | A1* | 7/2016 | Cole | H04N 23/50 |
| 2017/0150701 | A1 | 6/2017 | Gilmore et al. | |
| 2018/0000055 | A1 | 1/2018 | Tanase | |
| 2018/0027637 | A1 | 1/2018 | Kurt | |
| 2018/0168015 | A1 | 6/2018 | Casey et al. | |
| 2019/0228218 | A1 | 7/2019 | Barnaby et al. | |
| 2019/0340440 | A1 | 11/2019 | Atwater et al. | |
| 2019/0363791 | A1 | 11/2019 | Teo | |
| 2020/0077074 | A1* | 3/2020 | Denenberg | G01S 17/88 |
| 2020/0107524 | A1* | 4/2020 | Messana | A01K 29/005 |
| 2020/0113158 | A1 | 4/2020 | Rishi | |
| 2020/0155882 | A1 | 5/2020 | Tohidi et al. | |
| 2020/0288678 | A1 | 9/2020 | Howe et al. | |
| 2020/0288679 | A1 | 9/2020 | Howe | |
| 2020/0288680 | A1 | 9/2020 | Howe | |
| 2021/0080715 | A1 | 3/2021 | Saxena | |
| 2021/0142052 | A1 | 5/2021 | James | |
| 2023/0113746 | A1* | 4/2023 | Goswami | G06F 3/013 |
| | | | | 345/593 |

FOREIGN PATENT DOCUMENTS

| | | |
|---|---|---|
| CN | 108507697 | 9/2018 |
| EP | 2244934 | 11/2010 |
| EP | 3484283 | 5/2019 |
| JP | 2002171853 | 6/2002 |
| JP | 2015519073 A | 7/2015 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2013/014564 | 1/2013 |
| WO | WO 2013/186651 | 12/2013 |
| WO | WO 2014/179482 | 11/2014 |
| WO | WO2017137896 | 8/2017 |
| WO | WO 2018/011744 | 1/2018 |
| WO | WO2018011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2020/180188 | 9/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

Maloy et al., "A spatio-temporal recurrent network for salmon feeding action recognition from underwater videos in aquaculture," Computers and Electronics in Agriculture, Nov. 12, 2019, 9 pages.

Odey, "AquaMesh—Design and Implementation of Smart Wireless Mesh Sensor Networks for Aquaculture," American Journal of Networks and Communications, Jul. 2013, 8 pages.

Petrov et al., "Overview of the application of computer vision technology in fish farming," E3S Web of Conferences, 2020, 175:02015.

Saberloon et al., "Application of Machine Vision Systems in Aquaculture with Emphasis on Fish: State-of-the-Art and Key Issues," Reviews in Aquaculture, Dec. 2017, 9:369-387.

towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.

Wang, "Robust tracking of fish schools using CNN for head identification," Multimedia Tools and Applications, Nov. 2017, 20 pages.

Extended Search Report in European Appln. No. 22151132.2, dated May 2, 2022, 10 pages.

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln No. PCT/US2022/023831, dated Jul. 8, 2022, 13 pages.

International Search Report and Written Opinion in International Appln. No. PCT/US2020/059829, dated Feb. 25, 2021, 18 pages.

Meidell et al., "FishNet: A Unified Embedding for Salmon Recognition," Thesis for Master's degree in Artificial Intelligence, Norwegian University of Science and Technology, Jun. 2019, 86 pages.

Moskvyak et al., "Robust Re-identification of Manta Rays from Natural Markings by Learning Pose Invariant Embeddings," CoRR, Feb. 2019, arXiv:1902.10847v1, 12 pages.

Qiu et al., "Improving Transfer Learning and Squeeze-and-Excitation Networks for Small-Scale Fine-Grained Fish Image Classification," IEEE Access, Dec. 2018, 6(31):78503-78512.

Stein et al., "Consistent melanophore spot patterns allow long-term individual recognition of Atlantic salmon *Salmo salar*," Journal of Fish Biology, Nov. 2017, 91(6):1699-1712.

International Preliminary Report on Patentability in International Appln. No. PCT/US2022/021683, dated Dec. 14, 2023, 8 pages.

\* cited by examiner

UNDERWATER CAMERA AS LIGHT SENSOR

TECHNICAL FIELD

This specification relates to light sensors, and one particular implementation relates to automatically performing actions in an aquaculture environment based on light sensed by underwater cameras.

BACKGROUND

Aquaculture involves the farming of aquatic livestock, such as fish, crustaceans, or aquatic plants. In aquaculture, and in contrast to commercial fishing, freshwater and saltwater livestock populations are cultivated in controlled environments. For example, the farming of fish can involve raising fish in tanks, fish ponds, or ocean enclosures.

The feeding habits of aquatic livestock change depending on the amount of ambient light that is available in a fish enclosure. For example, with sufficient ambient light, fish are better able to see sinking feed pellets, and may eat more. If there is not enough light for the aquatic livestock to see food, the aquatic livestock may eat less.

SUMMARY

In general, innovative aspects of the subject matter described in this specification relate to using underwater cameras as light sensors. At certain times during an underwater camera's patrol of an enclosure, the underwater cameras may capture images from within aquatic livestock enclosures, and the images can be used to determine a light level. The light level can be used by systems that determine when to initiate or cease feeding the aquatic livestock, for example when a system can instruct a blower or feed pipe conveyance to commence or stop providing feed pellets to a fish pen.

Particular embodiments of the subject matter described in this specification can be implemented so as to realize one or more of the following advantages. The techniques described below can be used to activate or deactivate feeding devices based on current ambient light conditions in the environment. The techniques described below can be used to activate or deactivate feeding devices based on predicted ambient light conditions in the environment. The techniques described below can be used to activate or deactivate feeding devices at a future time based on current or predicted ambient light conditions in the environment.

One aspect features obtaining images of a surface of water captured by a camera that faces upwards from a depth towards the surface of the water within an enclosure that encloses aquatic livestock. An ambient light metric is determined at the depth from the images of the surface of the water. A determination is made as to whether the camera satisfies one or more depth criteria. Based on determining that the depth of the camera satisfies the one or more depth criteria, it is determined that, based on the ambient light metric at the depth, one or more action criteria are satisfied, then initiating performance of an action to be performed for the aquatic livestock.

One or more of the following features can be included. Determining that one or more action criteria are satisfied can include determining an amount of ambient light based on the ambient light metric; and determining that the amount of ambient light at the depth exceeds a light threshold.

Determining that one or more action criteria are satisfied can include determining an amount of ambient light based on the ambient light metric; generating a data set that represents the amount of ambient light determined at the depth and previous amounts of ambient light determined at the depth; providing the data set to a machine-learning trained model; and receiving an indication of the action from the machine-learning trained model. The ambient light metric can be determined using an intensity value of one or more pixels of the image.

Determining that the depth of the camera satisfies one or more depth criteria can include comparing the depth to a depth threshold; determining that the depth does not exceed the depth threshold; and based on determining that the depth does not exceed the depth threshold, determining that the depth of the camera satisfies the one or more depth criteria.

Determining an ambient light metric at the depth from the images of the surface of the water can include determining a first amount of ambient light at the depth from a first image of the images; determining a second amount of ambient light at the depth from a second image of the images; and determining the ambient light metric at the depth based on an aggregate of the first amount of ambient light at the depth from the first image of the images and the second amount of ambient light at the depth from the second image of the images. Initiating performance of an action to be performed for the aquatic livestock can include transmitting an instruction to a feeder subsystem, and the instruction can be an indication to provide feed to the aquatic livestock. Initiating performance of an action to be performed for the aquatic livestock can include transmitting an instruction to a feeder subsystem, and the instruction can be an indication to stop providing feed to the aquatic livestock.

Determining that one or more action criteria are satisfied based on the ambient light metric at the depth can include determining a predicted amount of future ambient light at the depth based on the current ambient light metric and environmental data; determining that the predicted amount of ambient light at the depth exceeds a threshold value; and based on determining that the predicted amount of ambient light at the depth exceeds the threshold value, determining that the one or more action criteria are satisfied.

Determining that one or more action criteria are satisfied based on the amount of ambient light at the depth can include determining a feeding metric based on the ambient light metric and a measurement of feed delivered over a period; determining that the feeding metric satisfies one or more feeding metric criteria; and based on determining that the feeding metric satisfies the one or more feeding metric criteria, determining that the one or more action criteria are satisfied.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
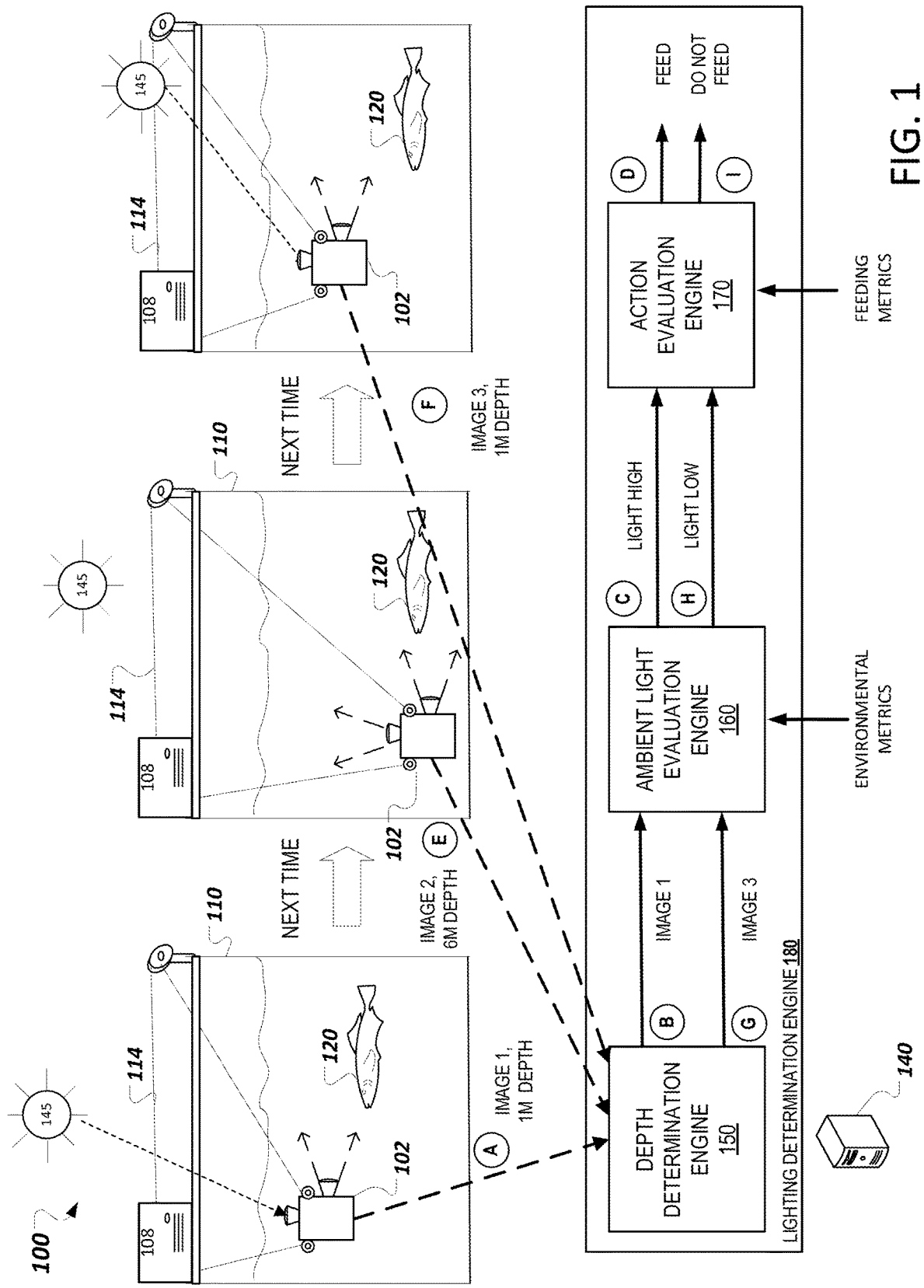
FIG. 1 is a diagram of an example system for sensing light.

FIG. 1 is a diagram of an example system 100 for sensing light. The system 100 can be used to determine whether the level of light present in an aquaculture environment is conducive to feeding.

Aquaculture includes the farming of marine organisms such as fish, crustaceans and mollusks. Aquaculture is important to the health of marine ecosystems, which can suffer from overharvesting. Some reports have indicated that over half of all fish and shellfish come from aquaculture, and in the absence of aquaculture, substantial, and perhaps irreversible, strain on marine ecosystems could result.

One challenge that exists in aquaculture is proper feeding. In some cases, the objective is to increase feeding times which aids in the cultivation of livestock. However, fish in an aquaculture environment typically only eat the feed pellets that they can see, and seeing feed pellets requires sufficient light. Therefore, to avoid wasting food pellets, the fish might only be fed when there is sufficient light for the fish see the pellets.

However, lighting conditions can vary substantially for a variety of reasons. For example, the duration and timing of daylight will vary based on the time of year. In fact, at far northern and far southern latitudes, the length of daylight can vary by over 12 hours. In addition, weather conditions, such as storms, can occlude sunlight, leaving insufficient lighting for the fish to see the feed pellets, even during typical daylight hours.

Fixed light sensors, devices that determine the level of light present at a given location at a given time or over a period of time, placed at or near the water surface can be used to detect light. However, fixed light sensors can become fouled over time. For example, in an aquaculture environment, sea water residue can accumulate on the sensor, reducing the sensor's effectiveness and other debris in the environment can block, or partially block, the sensor similarly reducing its effectiveness. In addition, it can be difficult to model light in the water from surface light sensor readings, for example, due to reflections off the water and water turbidity. Yet another challenge is that tables containing sunrise and sunset data can be insufficient due to geographic factors. For example, some aquaculture environments are situated near fjords which can block sunlight from reaching the environment. Therefore, it is advantageous to use submerged cameras to measure light levels.

With that introduction, FIG. 1 shows a system for sensing light. The system 100, shown at three times, can include an enclosure 110 with a winch system 114 and one or more camera subsystems 102.

The enclosure 110 may enclose livestock that can be aquatic creatures, such as livestock 120, which swim freely within the confines of the enclosure 110. In some implementations, the aquatic livestock 120 stored within the enclosure 110 can include finfish or other aquatic lifeforms. The livestock 120 can include for example, juvenile fish, koi fish, sharks, salmon, bass, or crustaceans, e.g., shrimp, to name a few examples.

In addition to the aquatic livestock, the enclosure 110 contains water, e.g., seawater, freshwater, or rainwater, although the enclosure can contain any fluid that is capable of sustaining a habitable environment for the aquatic livestock.

The enclosure 110 can be illuminated with light from the sun 145. The intensity of the light from the sun 145 will vary throughout the day as the sun 145 rises and sets. In addition, the intensity of light will vary based on the location of the enclosure 110 and the date. For example, in extreme northern latitudes, there is very limited sunlight during winter months. In addition, light from the sun 145 can be occluded by clouds that pass between the sun 145 and the enclosure 110.

In some implementations, the system 100 may be anchored to a structure such as a pier, dock, or buoy. For example, instead of being confined within the enclosure 110, the livestock 120 can be free to roam a body of water, and the system 100 can monitor livestock within a certain area of the body of water without the enclosure 110.

The winch subsystem 108 may move the camera subsystem 102 up and down to different depths in the enclosure 110. For example, the camera subsystem 102 may patrol up and down within the enclosure 110 while it monitors fish feeding. The winch subsystem 108 can include one or more motors, one or more power supplies, and one or more pulleys to which the cord 114, which suspends the camera subsystem 102, is attached. A pulley is a machine used to support movement and direction of a cord, such as cord 114. Although the winch subsystem 108 includes a single cord 114, any configuration of one or more cords and one or more pulleys that allows the camera subsystem 102 to move and rotate, as described herein, can be used.

The winch subsystem 108 may activate one or more motors to move the cord 114. The cord 114, and the attached camera subsystem 102, can be moved along the x, y, and z-directions, to a position corresponding to the instruction. A motor of the winch subsystem 108 can be used to rotate the camera subsystem 102 to adjust the horizontal angle and the vertical angle of the sensor subsystem. A power supply can power the individual components of the winch subsystem. The power supply can provide AC and DC power to each of the components at varying voltage and current levels. In some implementations, the winch subsystem can include multiple winches or multiple motors to allow motion in the x, y, and z-directions.

Each camera subsystem 102 can include one or more image capture devices that can point in various directions, such as up, down, to any side, or at other angles. Each camera subsystem 102 can take images using any of its included imaging devices, and an enclosure 110 can contain multiple camera subsystems 102.

A camera subsystem 102 can deliver data to a lighting determination engine 180. The data can include one or more images captured by a camera subsystem 102. Images can be represented in any appropriate format such as JPEG, TIFF, BMP, raw, and so on.

The data provided by the camera subsystem can also include metadata about the image. Such image metadata can include an identifier of the camera subsystem 102 that captured the image, the time the image was captured, the depth of the camera subsystem 102 at the time the image was captured, and so on.

The camera subsystem 102 can determine the depth using a sensor attached to the camera subsystem 102, from depth data provided by the winch subsystem 108 or using other techniques.

The lighting determination engine 180 can include of a depth determination engine 150, an ambient light evaluation engine 160 and an action evaluation engine 170. The light determination engine 180 can induce feeding actions.

The depth determination engine 150 can collect data from the camera subsystem 102, such as images and their associated metadata, such as the depth of the camera subsystem, an indication of which imaging device on the camera subsystem 102 captured the image, etc.

The ambient light evaluation engine 160 can receive the image and image metadata, such as which camera device captured the image, from the depth determination engine 150 and determine an ambient light metric. To determine the ambient light metrics, the ambient light evaluation engine 160 can also obtain information such as the environmental information, such as current weather conditions and weather forecasts, current time of day, historical measurements regarding the light levels at various times of day for one or more given dates, and so on.

The ambient light evaluation engine 160 can determine a light metric, such as "low light" or "high light", or a numeric value that represents the level of light, and provides the light metrics the action evaluation engine 170.

The action evaluation engine 170 can use the light metric, along with other information, such as feeding metrics, to determine whether feeding should occur, and can cause a feeder subsystem to take action.

In the example of FIG. 1, in a first time period, an upward facing camera on camera subsystem 102 near the surface of the enclosure 110 captures light from the sun 145.

In step (A), the camera subsystem 102 passes the captured image, "Image 1," and metadata such as the camera depth and the camera identifier to the depth determination engine 150. The depth determination engine 150 can use the camera depth information to determine the depth of the camera. If the depth determination engine 150 determines that the image was taken when the camera subsystem 102 is at the peak of its patrol pattern and therefore may more accurately reflects the amount of ambient light (for example, since it is less lightly that livestock will obstruct light before it reaches the camera), the depth determination engine 150 can provide, in step (B), the image to the ambient light evaluation engine 160. The patrol pattern may be a path that includes a peak and a nadir between which the camera subsystem 102 moves. In this example, the image was taken at the peak of the patrol pattern, so the depth determination engine 150 does pass the image to the ambient light evaluation engine 160.

The ambient light evaluation engine 160 can evaluate the image to determine a metric that represents the level of light present in the environment or the level of light predicted to be present in the environment at some future time. The ambient light evaluation engine 160 can also receive metrics such as weather data and weather forecasts, and use such metrics in its determination. In this example, the sun 145 is near its apex resulting in strong illumination, so in step (C), ambient light evaluation engine 160 can pass an indication, such as "light high" to the action evaluation engine 170.

The action evaluation engine 170 can use the light metric to determine that lighting conditions, in this example, "light high", are conducive to feeding and can produce an indicator the causes a feeder subsystem to release feed. The action evaluation engine 170 can also receive information such as prior feeding decisions when making its determination.

Continuing the example in the second frame, in step (E), the camera subsystem 102 passes the captured image, "Image 2," and metadata such as the camera depth and the camera identifier to the depth determination engine 150. The depth determination engine 150 can use the camera depth information to determine the depth of the camera. In this case, the depth determination engine 150 determines that the images was not taken at the peak of the patrol pattern, so the lightening determination engine 180 is, for example, less likely to accurately determine the amount of ambient light entering the enclosure. Therefore, the depth determination engine 150 terminates the process.

Completing the example in the third frame, in step (F), the camera subsystem 102 passes the captured image, "Image 3," and metadata such as the camera depth and the camera identifier to the depth determination engine 150. The depth determination engine 150 can use the camera depth information to determine the depth of the camera. In this example, the image was taken at the peak of the patrol pattern, so the depth determination engine 150 does pass the image to the ambient light evaluation engine 160.

The ambient light evaluation engine 160 can evaluate the image determine a metric that represents the level of light present in the environment or the level of light projected to be present in the environment at some future time. In this example, the sun 145 is near its low point resulting in weak illumination, so in step (H), ambient light evaluation engine 160 can pass an indication, such as "light low" to the action evaluation engine 170.

The action evaluation engine 170 can use the light metric to determine that lighting conditions, in this example, "light low", are not conducive to feeding and can produce an indicator the causes a feeder subsystem not to release feed.

Figure 2:
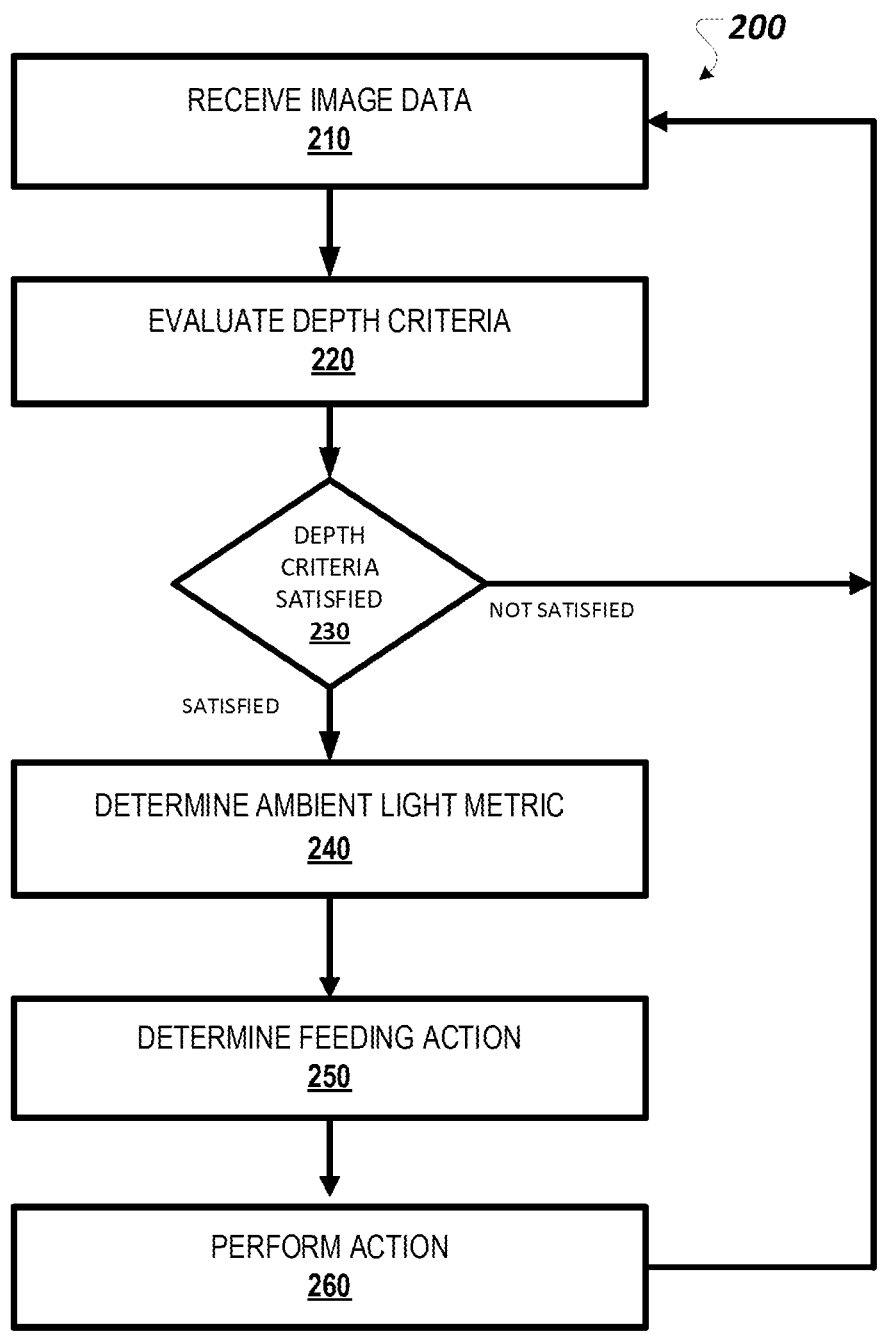
FIG. 2 is a flow diagram of an example process for sensing light.

FIG. 2 is a flow diagram of an example process for sensing light. For convenience, the process 200 will be described as being performed by a system of one or more computers located in one or more locations. For example, the lighting determination engine 180 of FIG. 1, appropriately programmed in accordance with this specification, can perform the process 200.

In operation 210 of the process 200, the system receives an image from an upward-facing camera and image metadata. For example, the depth determination engine 150 of the lighting determination engine 180 may receive Image 1 from the camera 102.

In operation 220 of the process 200, the system can evaluate depth criteria. For example, the depth determination engine 150 of the lighting determination engine 180 may receive depth information from a camera subsystem 102. In some implementations, the depth of the camera subsystem is compared to a configured depth threshold. If the camera subsystem is at or above the depth threshold—that is, at or near the peak of the patrol pattern—the system determines that the depth criteria are satisfied; if the camera subsystem is below the depth threshold—that is, not at the peak of the patrol pattern—the system determines that the depth criteria are not satisfied. The depth can be determined based on metadata associated with the received image, by depth data provided by the winch system, depth data provided by other sensors in the environment, and so on.

In decision operation 230 of the process 200, if the depth criteria are satisfied, the system proceeds to operation 240. If the depth criteria are not satisfied, the system returns to operation 210.

In operation 240 of the process 200, the system determines an ambient light metric. For example, the ambient light evaluation engine 160 of the lighting determination engine 180 may receive an image from the depth determination engine 150, and determine the ambient light metric at least in part from the image. The system can determine the ambient light metric based on the current amount of ambient light in the environment which is reflected in the amount of light captured in the image.

To determine the current light level using the image, the system can determine the average relative luminance of the pixels in the image. For example, if the system captures black and white images, the relative luminance of a pixel can be the pixel value, where black is represented as zero and white is represented by a maximum value of 255. In another example, if the system uses a color camera devices, the system can calculate the relative luminance as a linear combination of the red, green and blue components of the pixel value, such as: 0.2126R+0.7152G+0.0722B, where R is the red value, G is the green value and B is the blue value for the pixel. In both cases, system can sum the pixel values and divide by the number of pixels to determine the average relative luminance of the pixels in the image.

In some implementations, the ambient light metric used by the system is the computed average relative luminance of the pixels in the image. In some implementations, the ambient light metric is a token representing a range of light values, such as "high," "medium," and "low." To determine the proper token, the system compares the average relative luminance of the pixels in the image to configured thresholds. For example, values over 50 might be deemed "high;" values from 10 to 50 might be deemed "medium," and valued under 10 might be deemed "low."

In some implementations, the system can evaluate projected future light levels, for example, by evaluating weather forecast data. The system can obtain weather forecast data from forecasting agencies that provide the data, from people tasked with providing forecast data for the location of the enclosure, or from other sources. To use the weather data, the system can, for a forecasted weather event, such as light rain, heavy rain or snow, compute a projected relative luminance by reducing the computed relatively luminance by a factor associated with the forecast weather event. For example, light rain might reduce luminance by 30% and heavy rain by 70%. The system can use that computed value as the numeric ambient light metric, or compare the projected relative luminance to the threshold values to assign tokens.

In some implementations, the system can use a series of measurements of relative luminance to determine the ambient light metric. The series of measurements can be taken in multiple circumstances.

First, the series of measurements can be taken while a camera subsystem remains in at or near the peak of the patrol pattern. For example, if the camera remains at the peak of the patrol pattern for one minute, the camera subsystem can take a series of six images each 10 seconds apart. The system can compute the average luminance values for each of those images, then compute the average of the average luminance values to determine the ambient light metric. Such an approach can be useful, for example, when livestock briefly resides between the camera and the water surface, blocking some light from reaching the camera. Relying on a single measurement can cause the system to inaccurately determine lighting conditions based on such transient factors, while using an average of average luminance values can compensate for the transient factors.

Second, the series of measurements can be taken across trips by the camera subsystem to the peak of its patrol pattern. For example, in FIG. 1, the camera subsystem is at the peak of its patrol pattern at a first time period (producing Image 1), not at the peak of it patrol pattern at a second time period (producing Image 2), and again at the peak of its patrol pattern in a third time period (producing Image 3). The system can determine the ambient light metric using a trend of average luminance values, for example, computed from Image 1 and Image 3, as described further below.

In some implementations, the system can use time of day and sunrise and sunset to project future light levels. The system can compare the current time of day to the sunrise and sunset times to determine whether, and by how much, the relative luminance is projected to increase or to decrease. For example, if the time of day is approaching sunset, the system can determine that, over the expected feeding period, the relative luminance will decrease by a factor determined by historical measurements. Conversely, if the time of day is shortly after sunrise, the system can determine that, over the expected feeding period, the relative luminance will increase by a factor determined by historical measurements. The system can use that value as the numeric ambient light metric, or compare the projected relative luminance to the threshold values to assign tokens.

In some implementations, the system can also provide within the ambient light metric, a series of values that reflect predicted ambient light levels over a given period of time. For example, the ambient light metrics might provide a computed first value, a predicted final value, and a time period between the first value and the final value. In addition, the system can provide within the ambient light metric a series of value that reflect predicted ambient light levels at enumerated times, such as "0 at 7 am, 10 at 8 am, 40 at 9 am" and so on. Such predicted value can be computed, for example, by fitting a curve to a series of measured average luminance values or a series of ambient light metrics.

In operation 250 of the process 200, the system determines a feeding action by evaluating action criteria. For example, the action evaluation engine 170 of the lighting determination engine 180 may receive an ambient light metric from the ambient light evaluation engine 160, and determine a feeding metric based at least in part of the ambient light metric. Feeding actions can include, for example, "feed and" "do not feed," and more complex actions such as "feed for 10 minutes," "feed for 10 minutes starting in 5 minutes," and so on.

In some implementations, to evaluate the action criteria, the system can compare the ambient light metric to a configured threshold, and if the ambient light metric exceeds the threshold, the system can determine that lighting conditions are conducive to feeding and produce a "feed" indicator; conversely if the ambient light metric is below a threshold value, the system can determine that lighting conditions are not conducive to feeding and produce a "do not feed" indicator. The threshold value can be configured based on observations of prior fish feeding behavior at various light levels.

In some implementations, the system can evaluate predicted values within the ambient light metric. For example, if the ambient light metric has a current value of 20, and a value reflecting a prediction of 0 for 10 minutes from the current time, the system can determine that feeding should occur for 10 minutes, then cease.

In some implementations, the system can use one or more trained machine learning models to determine a feeding action. The machine learning models can be classification models such as a logistic regression model or a decision tree. Features used by the machine learning model can include the current ambient light metric, prior ambient light metrics, ambient light metrics that include projections of future light metrics, weather forecast data, the current date and time, sunrise and sunset times, latitude, and so on. The output of the model can be a value corresponding to a recommended feeding action.

In operation 260 of the process 200, the system can cause action to be taken based on the feeding action determine in operation 250. For example, if the feeding action is "feed," the action evaluation engine 170 of the lighting determination engine 180 can produce a signal that activates a feeding machine; conversely, if the feeding action is "do not feed,"

the action evaluation engine 170 of the lighting determination engine 180 can produce a signal can deactivate a feeding machine.

While this specification has largely described an implementation of framework that senses light in an aquaculture environment to transmit instructions to a feeder system, the framework can be used additionally or alternatively to transmit signals for other purposes.

In some implementations, the system can determine that a weather storm will afflict an aquaculture environment by detecting illumination levels below illumination levels customarily detected at the environment at the particular date and time. In response, the system can, for example, send a signal to the camera subsystem indicating that the camera subsystem should travel away from netting that encloses the environment, thereby reducing the likelihood that the weather storm will cause the camera subsystem to become entangled in the netting.

In some implementations, the system can determine that the lighting conditions are appropriate for tasks such as biomass estimation or disease measurement, and are expected to remain appropriate for the duration of the task.

For example, biomass estimation is often performed when lighting conditions exceed a configured threshold. If the system determines that lighting conditions will exceed the configure threshold for the expected duration of a biomass estimation cycle, the system can transmit a signal that causes biomass estimation to begin.

Conversely, disease management is often performed when lighting conditions are below a configured threshold. If the system determines that lighting conditions will be below the configure threshold for the expected duration of disease measurement, the system can transmit a signal that causes diseases measurement to begin.

Other tasks that can rely on a determination of current or expecting lighting conditions can similarly be initiated by the system.

In addition, while this specification has largely described an implementation of framework that senses light in an aquaculture environment, other implementations can apply to systems that sense light in other environments.

In one such implementation, a framework for sensing light can be used in an agriculture environment where light the framework senses and analyzes light at or near feeding devices. Such an implementation of the framework can ensure that living creatures that feed using the feeding device are fed when there is sufficient light for them see the food.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    obtaining, by a camera system that includes an upward-facing camera and one or more side-facing cameras, images of a surface of water captured by the upward-facing camera facing towards the surface of the water from a depth within an enclosure that encloses aquatic livestock;
    determining that the depth of the upward-facing camera satisfies one or more depth criteria;
    in response to determining that the depth of the upward-facing camera satisfies the one or more depth criteria, determining from the images of the surface of the water that were captured by the upward-facing camera, an ambient light metric at the depth;

determining that one or more action criteria are satisfied based on the ambient light metric at the depth; and based on determining that the one or more action criteria are satisfied based on the ambient light metric at the depth, initiating performance of an action to be performed for the aquatic livestock.

2. The computer-implemented method of claim 1, wherein determining that the one or more action criteria are satisfied based on the ambient light metric at the depth comprises:

determining an amount of ambient light based on the ambient light metric; and determining that the amount of ambient light at the depth exceeds a light threshold.

3. The computer-implemented method of claim 1, wherein determining that one or more action criteria are satisfied comprises:

determining an amount of ambient light based on the ambient light metric;

generating a data set that represents the amount of ambient light determined at the depth and previous amounts of ambient light determined at the depth;

providing the data set to a machine-learning trained model that is trained to output actions for input data sets that represent amounts of ambient light determined at depths; and receiving an indication of the action from the machine-learning trained model.

4. The computer-implemented method of claim 1, wherein the ambient light metric is determined using an intensity value of one or more pixels of the image.

5. The computer-implemented method of claim 1, wherein determining that the depth of the camera satisfies one or more depth criteria comprises:

comparing the depth to a depth threshold;

determining that the depth does not exceed the depth threshold; and based on determining that the depth does not exceed the depth threshold, determining that the depth of the camera satisfies the one or more depth criteria.

6. The computer-implemented method of claim 1, wherein determining from the images of the surface of the water, an ambient light metric at the depth comprises:

determining a first amount of ambient light at the depth from a first image of the images;

determining a second amount of ambient light at the depth from a second image of the images; and determining the ambient light metric at the depth based on an aggregate of the first amount of ambient light at the depth from the first image of the images and the second amount of ambient light at the depth from the second image of the images.

7. The computer-implemented method of claim 1, wherein initiating performance of an action to be performed for the aquatic livestock comprises:

transmitting an instruction to a feeder subsystem, wherein the instruction indicates to provide feed to the aquatic livestock.

8. The computer-implemented method of claim 1, wherein initiating performance of an action to be performed for the aquatic livestock comprises:

transmitting an instruction to a feeder subsystem, wherein the instruction indicates to stop providing feed to the aquatic livestock.

9. The computer-implemented method of claim 1, wherein determining that one or more action criteria are satisfied based on the ambient light metric at the depth comprises:

determining a predicted amount of future ambient light at the depth based on the current ambient light metric and environmental data;

determining that the predicted amount of ambient light at the depth exceeds a threshold value; and based on determining that the predicted amount of ambient light at the depth exceeds the threshold value, determining that the one or more action criteria are satisfied.

10. The computer-implemented method of claim 1, wherein determining that one or more action criteria are satisfied based on the amount of ambient light at the depth comprises:

determining a feeding metric based on the ambient light metric and a measurement of feed delivered over a period;

determining that the feeding metric satisfies one or more feeding metric criteria; and based on determining that the feeding metric satisfies the one or more feeding metric criteria, determining that the one or more action criteria are satisfied.

11. A system comprising:

one or more processors; and one or more non-transitory computer-readable media storing instructions that, when executed, cause the one or more processors to perform operations comprising:

obtaining, by a camera system that includes an upward-facing camera and one or more side-facing cameras, images of a surface of water captured by the upward-facing camera facing towards the surface of the water from a depth within an enclosure that encloses aquatic livestock;

determining that the depth of the upward-facing camera satisfies one or more depth criteria;

in response to determining that the depth of the upward-facing camera satisfies the one or more depth criteria, determining from the images of the surface of the water that were captured by the upward-facing camera, an ambient light metric at the depth;

determining that one or more action criteria are satisfied based on the ambient light metric at the depth; and based on determining that the one or more action criteria are satisfied based on the ambient light metric at the depth, initiating performance of an action to be performed for the aquatic livestock.

12. The system of claim 11, wherein determining that one or more action criteria are satisfied comprises:

determining an amount of ambient light based on the ambient light metric; and determining that the amount of ambient light at the depth exceeds a light threshold.

13. The system of claim 11, wherein determining that one or more action criteria are satisfied comprises:

determining an amount of ambient light based on the ambient light metric;

generating a data set that represents the amount of ambient light determined at the depth and previous amounts of ambient light determined at the depth;

providing the data set to a machine-learning trained model that is trained to output actions for input data sets that represent amounts of ambient light determined at depths; and receiving an indication of the action from the machine-learning trained model.

14. The system of claim 11, wherein determining that the depth of the camera satisfies one or more depth criteria comprises:
   comparing the depth to a depth threshold;
   determining that the depth does not exceed the depth threshold; and
   based on determining that the depth does not exceed the depth threshold, determining that the depth of the camera satisfies the one or more depth criteria.

15. The system of claim 11, wherein determining from the images of the surface of the water, an ambient light metric at the depth comprises:
   determining a first amount of ambient light at the depth from a first image of the images;
   determining a second amount of ambient light at the depth from a second image of the images; and
   determining the ambient light metric at the depth based on an aggregate of the first amount of ambient light at the depth from the first image of the images and the second amount of ambient light at the depth from the second image of the images.

16. The system of claim 11, wherein initiating performance of an action to be performed for the aquatic livestock comprises:
   transmitting an instruction to a feeder subsystem, wherein the instruction indicates to provide feed to the aquatic livestock.

17. The system of claim 11, wherein initiating performance of an action to be performed for the aquatic livestock comprises:
   transmitting an instruction to a feeder subsystem, wherein the instruction indicates to stop providing feed to the aquatic livestock.

18. The system of claim 11 wherein determining that one or more action criteria are satisfied based on the ambient light metric at the depth comprises:
   determining a predicted amount of future ambient light at the depth based on the current ambient light metric and environmental data;
   determining that the predicted amount of ambient light at the depth exceeds a threshold value; and
   based on determining that the predicted amount of ambient light at the depth exceeds the threshold value, determining that the one or more action criteria are satisfied.

19. The system of claim 11, wherein determining that one or more action criteria are satisfied based on the amount of ambient light at the depth comprises:
   determining a feeding metric based on the ambient light metric and a measurement of feed delivered over a period;
   determining that the feeding metric satisfies one or more feeding metric criteria; and
   based on determining that the feeding metric satisfies the one or more feeding metric criteria, determining that the one or more action criteria are satisfied.

20. A non-transitory, computer-readable medium storing one or more instructions executable by a computer system to perform operations comprising:
   obtaining, by a camera system that includes an upward-facing camera and one or more side-facing cameras, images of a surface of water captured by the upward-facing camera facing towards the surface of the water from a depth within an enclosure that encloses aquatic livestock;
   determining that the depth of the upward-facing camera satisfies one or more depth criteria;
   in response to determining that the depth of the upward-facing camera satisfies the one or more depth criteria, determining from the images of the surface of the water that were captured by the upward-facing camera, an ambient light metric at the depth;
   determining that one or more action criteria are satisfied based on the ambient light metric at the depth; and
   based on determining that the one or more action criteria are satisfied based on the ambient light metric at the depth, initiating performance of an action to be performed for the aquatic livestock.

* * * * *